Patented Jan. 14, 1941

2,228,577

UNITED STATES PATENT OFFICE 2,228,577

PYRO-ANDROSTANE COMPOUNDS AND METHOD OF MAKING THEM

Russell Earl Marker, State College, Pa., assignor to Parke, Davis & Company, Detroit, Mich., a corporation of Michigan No Drawing. Application July 3, 1937, Serial No. 151,833

9 Claims. (Cl. 260—586)

The invention relates to a new group of oxygenated dimethyl-1,2,5,6-dicyclopentano perhydronapthalene compounds derived from dimethyl cyclopentano perhydrophenanthrene compounds of the sterol and male sex hormone series.

In preparing the new compounds of the invention a dicarboxylic acid is first obtained by oxidizing and opening the six-membered carbon ring A of the cyclopentano perhydrophenanthrene skeleton of a sterol or male sex hormone type of compound. The dicarboxylic acid is then pyrolyzed to cause elimination of carbon dioxide with formation of a cyclopentano ring containing a ketone group. Because of the pyrolytic treatment used, the new compounds are designated as derivatives of pyro-androstane. In accordance with this designation, pyro-androstane, or dimethyl-1,2,5,6-dicyclopentano perhydronapthalene, has the formula:

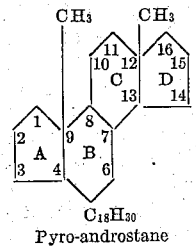

Pyro-androstane

The oxygenated pyro-androstane derivatives of the invention may be represented by the following formula:

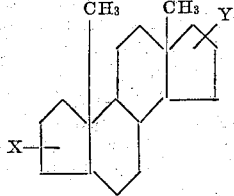

In the above formula, each of the oxygenated substituents X and Y represents a member of the class consisting of secondary hydroxyl and carbonyl oxygen. These substituents have been found in the natural sex hormone series to be of great significance for physiological activity and they also have significance for the activity of the compounds of this invention. The compounds of the invention are of interest not only from the standpoint of physiological properties, but also because of their chemically close relationships to the known male sex hormone compounds and the possibility of using them as intermediates in making other compounds of related chemical composition.

In preparing the compounds of the invention it has been found desirable to start with a suitable sterol or male sex hormone type of compound capable of oxidation at ring A and to break open this ring of the cyclopentano phenanthrene skeleton with production of a dicarboxylic acid, which is then submitted to heat treatment to pyrolyze it into a compound wherein ring A is a cyclopentano ring substituted by a ketonic oxygen atom.

When starting with a male sex hormone type of compound, where the group Y, corresponding to Y of the above general formula, is already a secondary hydroxyl radical or a ketonic oxygen atom, the pyro-ketone derivatives directly obtained by heat treatment are new compounds.

When the dicarboxylic acid is derived from a sterol and contains a hydrocarbon side chain the ketonic compound obtained by pyrolysis is a pyrosterol compound and may be converted to one of the new compounds of this invention by oxidizing off the hydrocarbon side-chain, or otherwise replacing it by a secondary hydroxyl group or a ketonic oxygen atom. For the latter purpose, any of the known methods for oxidizing off the side-chain of sterols and their derivatives may be applied to the pyro-sterol compounds. Those methods of oxidizing off the side-chain are excluded which would be so vigorous as to completely oxidize or open up the cyclopentano rings A or D. Where the side-chain at carbon atom No. 16 of a pyro-sterol compound is being oxidized off, it is usually preferable to acylate or otherwise protect the hydroxyl group attached to ring A of the pyro-sterol during the oxidation.

For example, a sterol type of compound, such as β-cholestanol, can be oxidized with chromic acid to open ring A of the β-cholestanol and give a dicarboxylic acid, $C_{27}H_{46}O_4$, probably having the following formula:

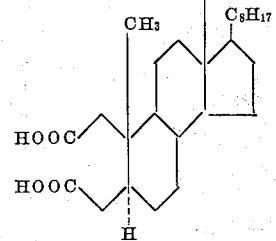

The dicarboxylic acid is then pyrolyzed by heating, for example in solution in an organic acid anhydride, such as acetic anhydride. The product of pyrolysis in the case of the acid from β-cholestanol is pyro-β-cholestanone having the following formula:

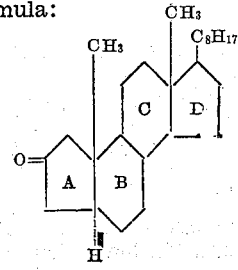

A sterol pyroketone thus obtained may then be oxidized to convert the side-chain to a ketonic oxygen atom with the production of one of the new diketone compounds of the invention, where X and Y of the general formula are ketonic oxygen atoms. Alternatively, the sterol pyroketone may first be reduced to a pyro-sterol derivative where ring A contains a hydroxyl instead of ketonic oxygen. These pyro-sterol compounds are new and are useful as intermediates in making the more oxygenated compounds of the above general formula. The hydroxyl group may then be acylated or otherwise protected and the side-chain, e. g. $C_8H_{17}$, oxidized off and replaced by ketonic oxygen. Upon hydrolyzing the acylated ketone so obtained, there is produced a pyro-androstane compound having a hydroxyl in ring A and a ketone group in ring D. In this case, X of the general formula is —OH and Y is =O.

Using $\beta$-cholestanol as an example, the reactions just mentioned may be illustrated diagrammatically as follows:

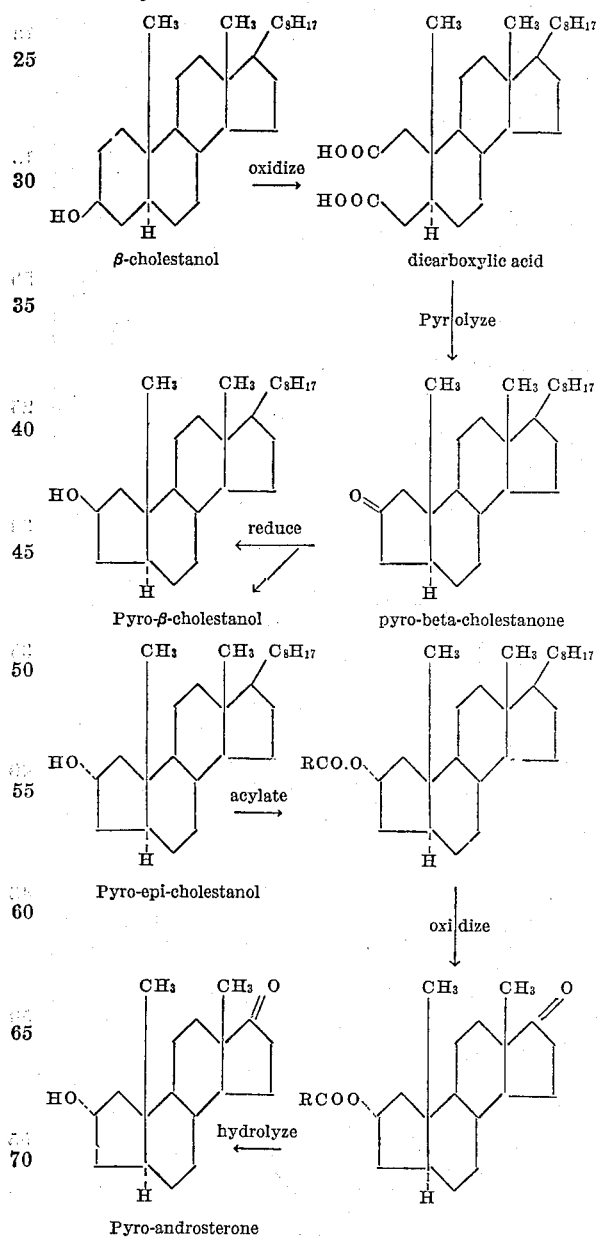

β-cholestanol
dicarboxylic acid
Pyrolyze
Pyro-β-cholestanol
pyro-beta-cholestanone
acylate
Pyro-epi-cholestanol
oxidize
hydrolyze
Pyro-androsterone In the case of pyro-$\beta$-cholestanol, obtained as indicated above, acylation followed by oxidation and then hydrolysis gives pyro-iso-androsterone similarly to the production of pyro-androsterone. The pyro-iso-androsterone has the same formula as pyro-androsterone with the exception of the hydroxyl group in ring A which has the opposite steric arrangement from that of the hydroxyl in pyro-androsterone.

As to compounds of the invention where X and Y of the formula represent the same groups, these may be readily prepared by starting with a compound in which one of the groups X and Y is hydroxyl and the other group is ketonic oxygen, and oxidizing the hydroxyl to obtain a diketone, or, reducing the ketonic oxygen to obtain a di-alcohol or diol type of compound. For example, in the case of pyro-androsterone illustrated above, this compound may be hydrogenated (reduced) to give pyro-androstandiol. On the other hand, it may be oxidized at No. 2 carbon atom to produce pyro-androstandione. These compounds have the following formulas, respectively:

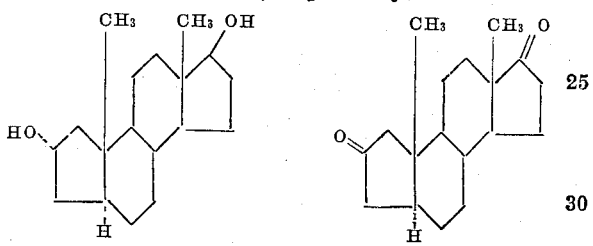

Pyro-androstane diol   pyro-androstane dione

Instead of oxidizing a sterol or male sex hormone type of compound to directly obtain a dicarboxylic acid suitable for the pyrolytic step, one may start with the corresponding halogen derivative of the sterol or male sex hormone type compound having the hydroxyl in ring A replaced by halogen. The halogen derivative is then treated with a reagent capable of removing hydrogen halide to give a compound having an unsaturated double-bond in ring A which is easily attacked by oxidizing agents at the double-bond to give the desired dicarboxylic acid. Quinoline or similar compounds may be used to remove hydrogen halide.

The advantage of starting with a male sex hormone type of compound is that one does not need to oxidize off a hydrocarbon side-chain as is necessary when starting with a sterol type of compound. In other words, by starting with a sex hormone type of compound, there is a secondary hydroxyl group or a ketonic oxygen atom already attached to the cyclopentano ring D, and it is only necessary to open up ring A to give a dicarboxylic acid which may then be pyrolyzed to give a ketonic oxygen atom in the cyclopentano ring A.

The invention will be more clearly understood by the following examples which are given merely by way of illustration and not by way of limiting the invention to the specific materials and conditions described therein.

EXAMPLE 1.—*Conversion of a dimethyl cyclopentano perhydro phenanthrene compound, having a double bond in ring A, into a dicarboxylic acid intermediate capable of pyrolysis*

2 g. of neocholestene, obtained by heating cholestyl chloride with quinoline, is dissolved in 200 cc. of chloroform. Ozone is then passed through the cooled solution for an hour, after which the chloroform is partially evaporated under reduced pressure. Acetic acid is added to the residue and the mixture heated on a steam bath for two hours. The solution is cooled and a solution of 2 g. of chromic anhydride in 50 cc. of acetic acid is added. The mixture is stirred for an hour and then diluted with water and finally extracted with ether. The product is obtained by evaporating off the ether and is then recrystallized from acetic acid to give a dicarboxylic acid melting at 193° C. This acid is the same as that obtained by chromium oxide oxidation of β-cholestanol. There is no depression in melting point when samples of the dicarboxylic acid made by the two methods are tested in a mixed melting point test.

Anal. calcd. for $C_{27}H_{46}O_4$: C, 75.1; H, 10.7. Found: C, 174.7; H, 10.6.

The above oxidation of neocholestene by ozonolysis gives the same dicarboxylic acid as is obtained by oxidation of neocholestene with chromic acid in acetic acid.

EXAMPLE 2.—*Pyrolysis of dicarboxylic acid from neo-cholestene to pyro-cholestanone*

A solution of 5.5 g. of the acid in acetic anhydride is heated slowly to 250°, while distilling off the excess acetic anhydride. The ketone is then distilled at 250° at 5 mm. pressure. The distillate is recrystallized from ethyl alcohol, and pure crystals of pyro-cholestanone melting at 98° C. are obtained.

Anal. calcd. for $C_{26}H_{44}O$: C, 83.8; H, 11.7. Found: C, 83.9; H, 11.8.

EXAMPLE 3.—*Pyro-epi-cholestanol and pyro-beta-cholestanol*

To a solution of 3 g. of pyro-cholestanone in 19 cc. of dry isopropyl alcohol there is added 2 g. of distilled aluminum iso-propylate. The solution is refluxed for seven hours, then slowly distilled until the volume is approximately half that of the original mixture. This is treated with a hot solution of 1.6 g. of potassium hydroxide in 25 cc. of methyl alcohol and allowed to stand for one hour. The mixture is then poured into 200 cc. of water and extracted with ether. The product after evaporation of the ether is dissolved in 20 cc. of hot alcohol and added to a solution of 7 g. of digitonin in 175 cc. of alcohol. After standing overnight, the precipitate of the digitonide of pyro-beta-cholestanol which forms is filtered off and dried. The separated digitonide is then decomposed by warming with 30 cc. of pyridine until dissolved, then the solution is diluted with 300 cc. of ether. The digitonin is precipitated but by the ether. It is filtered off and the pyridine removed from it by washing with acid. The ether solution of the pyro-beta-cholestanol is evaporated and the residue recrystallized from dilute alcohol to give crystals melting at 130° C. This is pure pyro-beta-cholestanol.

Anal. calcd. for $C_{26}H_{46}O$: C, 83.4; H, 12.3. Found: C, 83.6; H, 12.3.

The filtrate from the digitonide is evaporated to dryness. Ether is added and the digitonin filtered off. The ether is evaporated and the residue recrystallized from dilute alcohol. The crystals melt at 155° C. They are pyro-epi-cholestanol.

Anal. calcd. for $C_{26}H_{46}O$: C, 83.4; H, 12.3. Found: C, 83.7; H, 12.1.

In the above experiment the epi-form predominates in the ratio of 2:1, whereas when the reduction of pyrocholestanone is carried out by sodium in alcohol and the products separated by the above method the pyro-beta-cholestanol predominates in the ratio of about 3:1.

Both the pyro-β-cholestanol and the pyro-epi-cholestanol form acetates. For example, 200 mg. of either of these pyro-cholestanols may be dissolved in 10 cc. of acetic anhydride and refluxed for 30 minutes, after which the acetic anhydride may be distilled off under reduced pressure and the residue crystallized from dilute alcohol. In the case of the acetate of pyro-epi-cholestanol, the melting point is 96° C. Pyro-β-cholestanol has a melting point of 77° C.

EXAMPLE 4.—*Preparation of pyro-androsterone from pyro-epi-cholestanol acetate and pyro-iso-androsterone from pyro-β-cholestanol acetate*

The mixture of pyro-β-cholestanol and pyro-epi-cholestanol, obtained by reduction of 81 grams of pyro-cholestanone by the method as described under Example 3 above, is acetylated without separation of the two isomers. The crude mixture of acetates is dissolved in 3500 cc. of acetic acid, the solution heated to 90° C. and while stirring the solution at this temperature 80 grams of chromic acid dissolved in 50 cc. of water and 200 cc. of acetic acid is added over a period of about 45 minutes. The solution is stirred for 6 hours at 90° C., cooled and the excess chromium oxide destroyed by addition of alcohol. The acetic acid is distilled from the reaction mixture under reduced pressure and the residue is dissolved in ether and water. The ether layer is washed free of acids with 10% sodium hydroxide solution after which the washed ethereal solution is evaporated and the residue steam distilled. The non-volatile residue from steam distillation is extracted with ether, the ether evaporated off and the residue dissolved in 200 cc. of alcohol. This alcoholic solution is cooled and filtered, if necessary. The alcoholic solution contains a mixture of pyro-androsterone and pyro-iso-androsterone. These may be separated from each other by forming an insoluble digitonide of the pyro-iso-androsterone and separating or filtering the digitonide precipitate from the more soluble pyro-androsterone compound. If desired, the alcoholic solution of pyro-androsterone and pyro-iso-androsterone may be treated either before or after the digitonide separation step by the usual method of purification by way of their semicarbazones followed by hydrolysis of the latter to regenerate the purified mixture of pyroketones. The pyro-androsterone and pyro-iso-androsterone, neither separatingly or mixed with one another, may be purified by any of the known methods for purifying keto-alcohols of this and similar types.

In any case, the separated digitonides are broken up by the usual method to remove digitonin and the remaining pyro-androsterone or pyro-iso-androsterone crystallized from a suitable solvent. For example, pyro-androsterone thus prepared may be crystallized from petroleum ether and has a melting point of 124° C.

Anal. calc. for $C_{18}H_{28}O_2$: C, 78.2; H, 10.2. Found: C, 78.0; H, 10.2.

Both the pyro-androsterone and the pyro-iso-androsterone form acetates. For example, 50 mgm. of pyro-androsterone melting at 124° C. is refluxed with 5 cc. of acetic anhydride. The acetic anhydride is distilled off at reduced pressure and the acetate of pyro-androsterone crystallized from petroleum ether. It melts at 102° C.

Anal. calc. for $C_{20}H_{30}O_3$: C, 75.4; H, 9.5. Found: C, 75.0; H, 9.4.

The semicarbazones of pyro-androsterone and pyro-iso-androsterone are made by the usual method of reacting with semicarbazide acetate in alcohol and crystallizing out the semicarbazone. For instance, the semicarbazone of pyro-androsterone made thus has a melting-point of 250° C.

Anal. calcd. for $C_{19}H_{31}N_3O_2$: C, 68.4; H, 9.5. Found: C, 68.4; H, 9.4.

EXAMPLE 5.—*Preparation of a dicarboxylic acid suitable for pyrolysis from a male sex hormone type of compound*

(a). Preparation of androstenone (androstene-2-one-17).

A solution of 15 g. of 3-chloro-androstanone is refluxed with 100 cc. of quinoline for 3 hours. Ether is added and the quinoline removed by shaking with hydrochloric acid. The ether layer is separated and the ether evaporated off, leaving a residue which is distilled under high vacuum at 110° C. The sublimate thereby obtained is then crystallized from dilute alcohol to give pure androstenone, having a melting point of 102° C.

Anal. calcd. for $C_{19}H_{28}O$: C, 83.8; H, 10.4. Found: C, 84.1; H, 10.3.

(b). Preparation of androstenol from androstenone.

Small pieces of sodium are added to a solution of 0.5 grams of androstenone in 60 cc. of propyl alcohol brought up to the boiling point. The sodium is added until no more dissolves. The solution is cooled, water added, and the androstenol extracted with ether. The ether is distilled off and the residue is crystallized from petroleum ether to give pure androstenol having a melting point of 165° C.

Anal. calcd. for $C_{19}H_{30}O$: C, 83.1; H, 11.0. Found: C, 83.2; H, 11.2.

(c). Preparation of acetate of androstenol.

1.5 grams of androstenol is refluxed one hour with 10 cc. of acetic anhydride after which the solvent is removed by vacuum distillation and the residue crystallized from petroleum ether. Crystals of pure acetate of androstenol are thus obtained, having a melting point of 96° C.

Anal. calcd. for $C_{21}H_{32}O_2$: C, 79.7; H, 10.2. Found: C, 80.0; H, 10.1.

(d). Dicarboxylic acid from androstenol acetate.

A solution of 1 g. of androstenol acetate in 100 cc. of chloroform is cooled to 0° C. and ozonized with a 4 per cent ozone-oxygen stream. The solvent is distilled off and the residue taken up in 50 cc. of acetic acid which contains 5 cc. of water. The solution is heated on a steam bath for one hour, and after cooling to room temperature a dilute solution of chromic oxide in acetic acid is added. It is then warmed to 60° C. for one hour. The solvent is evaporated and the residue taken up in water and extracted with ether. The ether solution is extracted with 10 per cent sodium carbonate solution until free of acids. The alkaline solution is acidified and the free dicarboxylic acid extracted with ether. The ether is driven off and the residue dissolved in 40 cc. of ethyl alcohol containing 3 g. of sodium hydroxide. The mixture is refluxed for one hour, cooled, and acidified with hydrochloric acid. The acid is again extracted with ether, the ether distilled off, and the residue crystallized from acetone. The pure crystals of the dicarboxylic acid melt at 273° C.

Anal. calcd. for $C_{19}H_{30}O_5$: C, 67.4; H, 9.0. Found: C, 67.8; H, 9.2.

EXAMPLE 6.—*Preparation of pyro-androstanone-2-ol-16*

A quantity of dicarboxylic acid prepared as described above under Examples 5—c. and 5—d. from 4.2 grams of androstenol is dissolved in 40 cc. of acetic anhydride and the solution distilled while removing the excess acetic anhydride over a period of one hour. The residue is heated to 250° C. for one hour, during which time a small amount of gas is evolved. The residue is then distilled using a pressure of 4 mm. of mercury. The distillate is dissolved in alcoholic sodium hydroxide and refluxed for about one half hour. At the end of this time water is added and the reaction product extracted with ether. The ether is distilled off and the residue sublimed under high vacuum at 135° C. The sublimate is crystallized from a mixture of petroleum ether and ethyl acetate and is in pure form, melting at 197° C.

Anal. calcd. for $C_{18}H_{28}O_2$: C, 78.1; H, 10.2. Found: C, 77.5; H, 10.4.

The semicarbazone of the pyro-androstanone-2-ol-16 is prepared in the usual way from semicarbazide acetate. It is obtained in pure crystalline form from alcohol and has a melting point of 238° C.

Anal. calcd. for $C_{19}H_{31}O_2N_3$: C, 68.4; H, 9.4. Found: C, 68.6; H, 9.6.

The above described preparation of pyro-androstanone-2-ol-16 may be diagrammatically represented as follows:

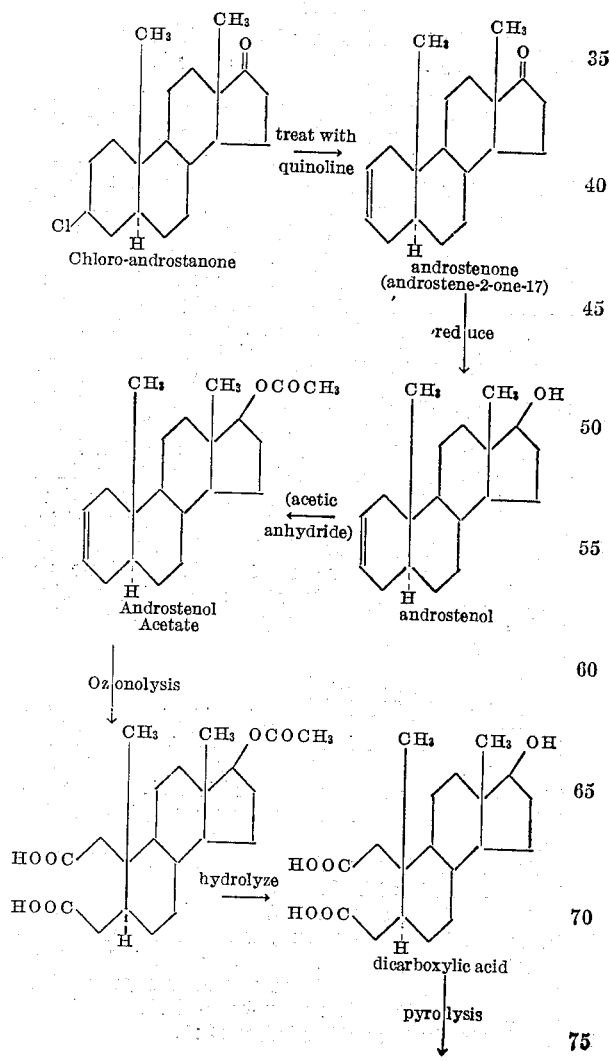

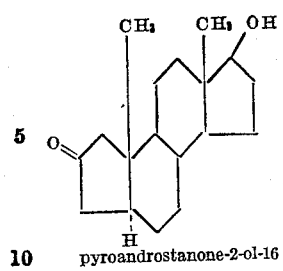

pyroandrostanone-2-ol-16

The invention may be practiced in many forms when following the invention in its broad features and is not to be considered as limited merely to the specific materials and details as described in the examples given.

What I claim as my invention is:

1. Process for the preparatiton of a 2-keto derivative of pyro-androstane which comprises the mild oxidative breaking of ring-A of an unsaturated compound of the sterol and male sex hormone type having the formula,

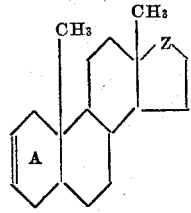

wherein Z is a member of the class, an oxygenated methylene carbon atom and a hydrocarbon-substituted methylene carbon atom, to form a dicarboxylic acid having the same number of carbon atoms as said unsaturated compound, and decarboxylating said acid to form a 2-keto derivative of pyro-androstane.

2. Process for the preparation of a 2-keto pyro-androstane oxygenated at its No. 16 carbon atom which comprises the mild oxidative breaking of ring-A of an unsaturated compound of the male sex hormone type having the formula,

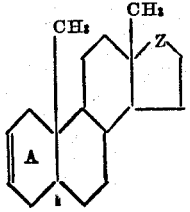

where Z is an oxygenated methylene carbon atom, to form a dicarboxylic acid having the same number of carbon atoms as said unsaturated compound, and decarboxylating said acid to form said 2-keto pyro-androstane derivative.

3. Process for the preparation of pyro-androstanone-2-ol-16 which comprises the mild oxidative breaking of ring-A of androstene-2-ol-17 to form a dicarboxylic acid having the same number of carbon atoms as androstene-2-ol-17, and decarboxylating said acid to form pyro-androstanone-2-ol-16.

4. Process for the preparation of pyro-β-cholestanone which comprises the mild oxidative breaking of ring-A of neo-cholestene to form a dicarboxylic acid having the same number of carbon atoms as neo-cholestene, and decarboxylating said acid to form pyro-β-cholestanone.

5. A pyro-androstane oxygenated at the No. 2 carbon atom and having a No. 16 carbon atom of the class comprising an oxygenated methylene carbon atom and a hydrocarbon-substituted methylene carbon atom.

6. Keto-hydroxy pyro-androstanes in which one of the No. 2 and the No. 16 carbon atoms is substituted by a secondary hydroxyl group and the other by a ketone oxygen atom.

7. A 2-hydroxy-16-keto pyro-androstane.

8. Pyro-androsterone.

9. Pyro-androstanone-2-ol-16 having the formula

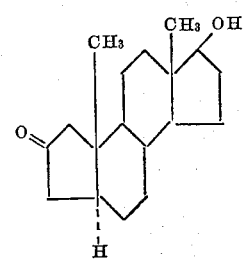

RUSSELL EARL MARKER.